US007189451B2

(12) United States Patent
Kiehne et al.

(10) Patent No.: US 7,189,451 B2
(45) Date of Patent: *Mar. 13, 2007

(54) MULTILAYER, MATT, THERMOFORMABLE, IR-REFLECTIVE POLYESTER FILM

(75) Inventors: Thorsten Kiehne, Shiga (JP); Ursula Murschall, Nierstein (DE); Holger Kliesch, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/173,439

(22) Filed: Jul. 1, 2005

(65) Prior Publication Data

US 2006/0008638 A1 Jan. 12, 2006

(30) Foreign Application Priority Data

Jul. 6, 2004 (DE) ............... 10 2004 032 596

(51) Int. Cl.
*B32B 27/08* (2006.01)
*B32B 27/18* (2006.01)
*B32B 27/20* (2006.01)
*B32B 27/36* (2006.01)
*B32B 37/15* (2006.01)

(52) U.S. Cl. ........... 428/319.7; 428/212; 428/324; 428/328; 428/347; 428/331; 428/403; 428/404; 428/304.4; 428/317.9; 428/318.4; 428/319.3; 428/480; 428/910; 528/302; 528/305; 528/308; 528/308.6; 264/173.17; 264/288.4; 264/290.2

(58) Field of Classification Search ............ None
See application file for complete search history.

(56) References Cited

U.S. PATENT DOCUMENTS

| | | | | |
|---|---|---|---|---|
| 3,900,653 A * | 8/1975 | Riboulet et al. | ............ | 428/212 |
| 3,983,285 A * | 9/1976 | Riboulet et al. | ............ | 428/212 |
| 4,252,885 A | 2/1981 | McGrail et al. | ............ | 430/533 |
| 5,795,528 A * | 8/1998 | Klein et al. | ............ | 264/290.2 |
| 6,338,890 B1 * | 1/2002 | Kobayashi et al. | ......... | 428/141 |
| 6,534,169 B2 * | 3/2003 | Pfeiffer et al. | ............ | 428/336 |
| 6,794,432 B2 * | 9/2004 | Murschall et al. | ......... | 524/130 |
| 6,805,192 B1 * | 10/2004 | Nagayama et al. | ............ | 165/42 |
| 6,872,460 B2 * | 3/2005 | Murschall et al. | ......... | 428/480 |
| 6,875,803 B2 * | 4/2005 | Murschall et al. | ............ | 524/91 |
| 6,902,818 B2 * | 6/2005 | Murschall et al. | ......... | 428/480 |
| 2002/0015835 A1 * | 2/2002 | Peiffer et al. | ............... | 428/216 |
| 2002/0071945 A1 * | 6/2002 | Peiffer et al. | ............... | 428/220 |
| 2002/0102399 A1 * | 8/2002 | Peiffer et al. | ............... | 428/336 |
| 2003/0004237 A1 * | 1/2003 | Murschall et al. | ......... | 524/100 |
| 2003/0032704 A1 * | 2/2003 | Murschall et al. | ......... | 524/136 |
| 2003/0068500 A1 * | 4/2003 | Murschall et al. | ....... | 428/423.7 |
| 2003/0108755 A1 * | 6/2003 | Murschall et al. | ......... | 428/480 |
| 2003/0170479 A1 * | 9/2003 | Peiffer et al. | ............... | 428/515 |
| 2006/0008638 A1 * | 1/2006 | Kiehne et al. | ............. | 428/323 |
| 2006/0008641 A1 * | 1/2006 | Kiehne et al. | ............. | 428/328 |

FOREIGN PATENT DOCUMENTS

| | | |
|---|---|---|
| EP | 0 346 768 A2 | 12/1989 |
| EP | 0 359 017 A2 | 3/1990 |
| EP | 0 414 049 A1 | 2/1991 |
| EP | 0 659 198 B1 | 3/1994 |
| EP | 0 791 620 A2 | 8/1997 |
| EP | 1 251 369 A2 | 10/2002 |
| GB | 2 344 596 A * | 6/2000 |
| WO | WO 94/13476 A1 | 6/1994 |
| WO | WO 94/13481 A1 | 6/1994 |

OTHER PUBLICATIONS

Werner, Eberhard et al., "Polyester, Films." Encyclopedia of Polymer Science and Engineering, vol. 12 (1988), pp. 193-216.*
H. Day, D. M. Wiles Journal Applied Polymer Science vol. 16, p. 203 (1972).

* cited by examiner

*Primary Examiner*—Vivian Chen
(74) *Attorney, Agent, or Firm*—ProPat, L.L.C.

(57) ABSTRACT

Multilayer, biaxially oriented polyester films which include as a constituent of the base layer B, a crystallizable polyester with increased diethylehe glycol content and/or increased polyethylene glycol content, and/or increased isophthalic acid content, preferably polyethylene terephthalate. The outer layers of the inventive films advantageously include at least one IR-reflective pigment and one UV stabilizer. The inventive films advantageously feature adjustable mattness, diffuse scattering power for visible light, high light transmittance, IR reflectance, and good thermoformability, and are suitable for thermally protective coatings or thermally protective packaging.

19 Claims, No Drawings

MULTILAYER, MATT, THERMOFORMABLE, IR-REFLECTIVE POLYESTER FILM

CROSS-REFERENCE TO RELATED APPLICATIONS

This application claims prriority to German parent application 10 2004 032 596.0 which is hereby incorporated by reference in its entirety.

FIELD OF THE INVENTION

The invention relates to a multilayer, matt, IR-reflective, thermoformable, biaxially oriented film comprised of a crystallizable polyester, the thickness of the film preferably being in the range from 3 to 200 µm. The film comprises at least one IR-reflective pigment and one UV stabilizer. The multilayer film features good orientability, adjustable mattness, diffuse scattering power for visible light, low permeability to IR radiation, high light transmittance, very good longitudinal and transverse mechanical properties, good thermoformability, very little yellowing after prolonged insolation, and cost-effective production. The invention further relates to a process for the production of this film and to its use.

BACKGROUND OF THE INVENTION

Biaxially oriented polyester films in the range of thickness from 3 to 200 µm are well known in the form of transparent, matt, and white films. These films are produced with pigments, e.g. silicon dioxide, calcium carbonate, barium sulfate, kaolin, titanium dioxide, aluminum oxide, or combinations thereof. These films are generally not thermoformable, do not exhibit diffuse scattering power for visible light, and do not reflect IR radiation.

EP 0 659 198 B1 describes composite materials intended for solar radiation purposes, screening purposes, and, respectively, filtering purposes, uses described being agriculture and horticulture. These films are comprised of a transparent polymer selected from the group of low- or high-density polyethylene, ethylene-vinyl acetate copolymer, polytetrafluoroethylene, polyvinylidene dichloride, polyvinyl chloride, polycarbonate, polymethyl methacrylate, and mixtures thereof. These films comprise from 0.1 to 30% by weight of an interference pigment which is comprised of a lamellar material, which has been coated with one or more metal oxides. These films feature selective screening of radiation, which has a favorable effect on plant growth.

EP 0 791 620 A2 describes films for agricultural applications comprised of polyetheramide block copolymers, of thermoplastic polyester elastomers, or of thermoplastic polyurethanes, having water-vapor permeability of from 100 to 25 000 g/m²/24 h, transmittance of from 20 to 90% for visible light, and transmittance of from 5 to 90% for thermal radiation with wavelength of 5 µm. The films comprise lamellar inorganic particles which have been coated with a substance with a high refractive index.

The films described have not been biaxially oriented and have inadequate longitudinal and transverse mechanical properties, making them unusable for many applications where the demands are high ultimate tensile strength, high modulus of elasticity, high tensile strain at break values, and high tensile stress values to generate 5% tensile strain ($F_5$ value).

The films described are moreover unsuitable for the thermoforming process, because the result would be uncontrolled orientation of the pigments partially orientated via melt flow. This would have an uncontrolled effect on optical properties of the film, e.g. gloss, haze, and mattness, via vacuole formation involving pigments and orientation of the film.

These films moreover yellow as a result of prolonged insolation, making them unsightly. The mechanical properties of the films are also impaired by insolation, and the films therefore become brittle after a very short time. This effect, brought about by the short-wave fraction of sunlight, is very much more pronounced in pigmented films, in particular in films which comprise photoactive metal oxides, e.g. titanium dioxide, than in unpigmented films.

EP 1 251 369 A2 describes biaxially oriented multilayer polyester films whose base layer comprises an IR-absorbent dye, and which are suitable for use as IR filters. This dye has an absorption maximum at from 800 to 1000 nm, and gives the film maximum transmittance of 30% at 950 nm.

The use of standard polyesters combined with biaxial orientation of the films described makes them unsuitable for thermoforming processes.

The films described are moreover unsuitable for outdoor applications because prolonged insolation impairs their mechanical and optical properties. Because the IR-absorbing dyes used are sensitive organic molecules which are decomposed by insolation, the IR-filter action of the films described rapidly reduces in outdoor applications.

SUMMARY OF ADVANTAGEOUS EMBODIMENTS OF THE INVENTION

It was therefore an object of the present invention to provide a matt, IR-reflective, thermoformable, polymer film which does not have the disadvantages known from the prior art for various types of film.

A further intention is that this film should not only be cost-effective to produce and have good longitudinal and transverse orientability, but should also have adjustable mattness, good thermoformability, and, primarily, very good mechanical properties, i.e. high longitudinal and transverse ultimate tensile strength, high longitudinal and transverse modulus of elasticity, high longitudinal and transverse tensile strain at break, and high longitudinal and transverse tensile stress to generate tensile strain of 5% ($F_5$ value), and in particular should have high light transmittance, diffuse scattering power for visible light, very low permeability to IR radiation, and very little change in yellowness index after prolonged insolation.

DETAILED DESCRIPTION OF ADVANTAGEOUS EMBODIMENTS OF THE INVENTION

The object is achieved by way of a multilayer, biaxially oriented polyester film which comprises, as main constituent of the base layer B, a crystallizable polyester whose DEG content is preferably greater than or equal to 1% by weight, and/or whose IPA content is preferably greater than or equal to 2% by weight, and/or whose PEG content is preferably greater than or equal to 1% by weight. This film is characterized by comprising at least one IR-reflective, preferably lamellar, pigment, and by comprising at least one UV stabilizer. Pigment and UV stabilizer are preferably added by means of masterbatch technology during film production. The preferred thickness of the inventive film is from 3 to 200

µm, in particular from 5 to 150 µm. DEG represents diethylene glycol, PEG represents polyethylene glycol, and IPA represents isophthalic acid. The film may comprise one or more crystallizable polyesters as main constituents.

The inventive film is preferably produced via coextrusion.

The following applies to the preferred film properties:

Good orientability includes the capability of the film to give excellent longitudinal and transverse orientation during its production, without break-offs.

Cost-effective production includes the capability of the raw materials or raw material components needed for producing the film to be dried using commercial industrial dryers of the prior art. It is important that the raw materials here do not cake and do not undergo thermal degradation. Among these prior-art industrial dryers are vacuum dryers, fluidized-bed dryers, and fixed-bed dryers (tower dryers).

Thermoformability means that the film can be thermoformed on commercially available thermoforming machines without uneconomic predrying to give complex and large-surface-area moldings.

Adjustable mattness means that the gloss of the film, and also its roughness, can be adjusted during the film production process either by way of the dimensions of the IR-reflective pigment (longitudinal dimension: transverse dimension) or else by way of the processing and orientation parameters during the film production process. Mattness also means that the inventive film has vacuoles whose length is preferably in the range from 0.5 to 20 µm.

Among the good mechanical properties are a high modulus of elasticity (greater than 3200 N/mm² longitudinally=in machine direction (MD), greater than 3500 N/mm² transversely (TD)), high ultimate tensile strength values (more than 100 N/mm² in MD; more than 130 N/mm² in (TD)), high tensile strain at break values (more than 100% in MD and TD), and high tensile stress values to generate 5% tensile strain ($F_5$ value; more than 100 N/mm² in MD and TD).

High light transmittance means that the light transmittance is greater than (>) 75%.

Diffuse scattering behavior means that image sharpness is smaller than (<) 85%.

Very low permeability to IR radiation means that transmittance for electromagnetic radiation in the wavelength range from 750 to 1300 nm is smaller than 50%.

Very little yellowing means that the change in yellowness index ($\Delta$YID) of the film after 5000 h of weathering in a Weather-Ometer is smaller than (<) 6.

These abovementioned values are preferred parameters for the inventive film.

The inventive film comprises, as main constituent, a crystallizable polyester. According to the invention, a crystallizable polyester is crystallizable homo-polyesters, crystallizable copolyesters, crystallizable blends of various polyesters, crystallizable recycled material, and other variations on crystallizable polyester.

Examples of suitable crystallizable or semicrystalline polyesters are polyethylene terephthalate (PET), polyethylene naphthalate (PEN), polybutylene terephthalate (PBT), polytrimethylene terephthalate (PTT), preference being given to polyethylene terephthalate (PET).

It is important for the invention that the DEG content and/or PEG content and/or IPA content of the crystallizable polyester is higher than that of standard polyesters. The crystallizable polyester preferably has a DEG content of from 1.0 to 10% by weight, preferably from 1.2 to 5.0% by weight, and in particular from 1.3 to 3.0% by weight, and/or a PEG content of from 1.0 to 10% by weight, preferably from 1.2 to 5.0% by weight, in particular from 1.3 to 3.0% by weight, and/or an IPA content of from 2.0 to 20% by weight, preferably from 3.0 to 15% by weight, and in particular from 5.0 to 10% by weight.

It was more than surprising that a higher DEG content and/or PEG content and/or IPA content in comparison with standard polyester makes the films capable of cost-effective thermoforming on commercially available thermoforming plants, giving excellent reproduction of detail, without any measurable alteration of optical properties, such as gloss and mattness.

The standard viscosity SV (DCA) of the polyester is generally from 600 to 1000, preferably from 700 to 900.

Preferred starting materials for production of the inventive film are crystallizable polyesters whose crystallite melting point Tm is from 180 to 365° C. or above, preferably from 180 to 310° C., whose crystallization temperature range $T_c$ is from 75 to 280° C., whose glass transition temperature $T_g$ is from 65 to 130° C. (determined via differential scanning calorimetry (DSC) at density of from 1.10 to 1.45 g/cm³ (determined via DIN 53479) and at crystallinity of from 5 to 65%, preferably from 20 to 65%.

The bulk density of the polyesters (measured to DIN 53466) is generally from 0.75 to 1.0 kg/dm³, preferably from 0.8 to 0.90 kg/dm³.

The polydispersity (=Mw:Mn ratio) of the polyester, measured via gel permeation chromatography (GPC) is preferably from 1.5 to 4.0, particularly preferably from 2.0 to 3.5.

"Main constituent" means that the content of the crystallizable or semicrystallizable polyester(s) in the base layer B is preferably from 50 to 100% by weight, particularly preferably from 75 to 95% by weight, based in each case on the total weight of the base layer B. The remaining fractions may comprise not only the IR-reflective pigment but also other pigments or additives conventional for biaxially oriented polyester films, e.g. UV stabilizers, flame retardants, and dyes.

The inventive film is comprised of at least one base layer B, of at least one outer layer A or C, and, if appropriate, of other intermediate layers, a particularly preferred structure here being three-layer A-B-A or A-B-C. For this embodiment it is advantageous if the melt viscosity of the crystallizable polyesters of the base layer B is similar to that of the outer layers adjacent to the base layer.

The components present in the outer layers and in any intermediate layers present may be the same, or to some extent the same, as those in the base layer, and the concentrations may also be those described. The outer layers and intermediate layers preferably comprise the crystallizable or semicrystalline polyester of the base layer.

In one particular embodiment, the base layer and/or the outer layers, and/or any intermediate layers present in the multilayer film may also be composed of a polyethylene naphthalate homopolymer, or of polyethylene terephthalate-polyethylene naphthalate copolymers, or of a polyethylene terephthalate/polyethylene naphthalate blend. In this embodiment, the melt viscosities of the polyesters of the outer and intermediate layers are likewise preferably similar to those of the polyester of the base layer.

In the inventive film, the IR-reflective pigment and the other additives and/or pigments are preferably present in the base layer. However, the outer layers and/or any intermediate layers present may also have been equipped with IR-reflective pigments and with other additives and/or pigments, if these are required.

The inventive film comprises at least one, preferably lamellar, IR-reflective pigment, and at least one UV stabilizer. It is advantageous for the pigment to be fed by way of masterbatch technology directly during film production, the concentration of the IR-reflective pigment here preferably being from 0.5 to 50% by weight, with preference from 1 to 25% by weight, and in particular from 1.5 to 10% by weight, based on the weight of the layer modified therewith.

Examples of suitable lamellar, IR-reflective pigments are phyllosilicates, e.g. kaolin, talc, or feldspar which have been coated with metal oxides, e.g. titanium dioxide, zirconium dioxide, aluminum oxide, and/or silicon dioxide. The size of the pigments is preferably from 1 to 100 μm. Pigments of this type are described by way of example in EP 0414049 of Merck and Hyplast, particular preference being given here to IRIODIN® SHR 870 and IRIODIN® SHR 875 from Merck, Germany.

In principle, all, preferably lamellar, IR-reflective pigments are suitable for the inventive purpose.

It is important that these pigments are orientated via the orientation of the film and, as a function of orientation, form vacuoles of varying size. These vacuoles determine the appearance of the film and the diffuse scattering power for visible light. This means that, given identical pigment content in the film, its optical properties and the diffuse scattering power can be adjusted by way of the stretching temperatures and the stretching parameters during film production.

It was more than surprising that the production and the formation of vacuoles is not impaired by the high DEG content and/or high PEG content and/or high IPA content of the polyester.

Since these vacuoles are optimized via the orientation process and have been stabilized via the heat-setting process, no adverse effect on optical properties occurs during the thermoforming process.

Electromagnetic radiation in the wavelength range from 750 to 1300 nm (IR) is in particular responsible for increases in indoor temperatures. This radiation likewise impairs heat-sensitive goods.

The film of the invention reflects radiation in this wavelength range, so that the transmittance of the film is preferably smaller than 50% at from 750 to 1300 nm. A consequence is less rise in indoor temperatures and the possibility of packaging heat-sensitive goods, if the inventive film is used appropriately.

Very surprisingly, application tests, IR spectra, and UV spectra have shown that, in the case of a three-layer film, it is entirely sufficient for the outer layers of preferred thickness from 0.5 to 4.0 μm to be treated with the lamellar, IR-reflective pigments and with the UV stabilizer in order to achieve very low IR permeability in combination with the low yellowness index, the vacuole-formation process, the diffuse scattering power, and the good thermoformability without alteration of the vacuoles and of mattness, while achieving the other properties. If there is a need, and preferably if requirements are stringent, the base layer may also have been treated with lamellar, IR-reflective pigment and with UV stabilizer, i.e. may have what is known as base-level treatment.

Measurements of optical properties have moreover shown that the inventive film can be produced with a very low yellowness index (smaller than [<] 4), and that the inventive film exhibits an extremely small change in yellowness index (smaller than [<] 6) after 5000 h of WOM weathering, equivalent to about 5 years of outdoor weathering in central Europe.

The inventive film comprises not only the IR-reflective pigment but also at least one UV stabilizer.

Light, in particular the ultraviolet content of insolation, i.e., the wavelength region from 280 to 400 nm, induces degradation in polyesters, as a result of which their appearance changes due to color change or yellowing, and there is also an extremely adverse effect on mechanical/physical properties of the films composed of the polyesters.

Inhibition of this photooxidative degradation is of considerable industrial and economic importance, since otherwise there are drastic limitations on the applications of polyesters and films produced therefrom.

The absorption of UV light by polyethylene terephthalates, for example, starts only just below 360 nm, increases markedly below 320 nm, and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide, and carboxylic acids. Besides direct photolysis of the ester groups, consideration has to be given to oxidation reactions which likewise form carbon dioxide via peroxide radicals.

In the photooxidation of polyethylene terephthalates there can also be cleavage of hydrogen at the position a to the ester groups, giving hydroperoxides and decomposition products of these, and this may be accompanied by the chain cleavage (H. Day, D. M. Wiles: J. Appl. Polym. Sci. 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for pale-colored or indeed opaquely colored films, since they cause discoloration or color change.

UV stabilizers suitable as light stabilizers are those which preferably absorb at least 70%, with preference 80%, particularly preferably at least 90%, of the UV light in the wavelength region from 180 to 380 nm, preferably from 280 to 350 nm. These are particularly suitable if they are thermally stable in the temperature range from 260 to 300° C., that is to say they do not decompose to give cleavage products and do not cause evolution of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to the 2-hydroxybenzotriazoles, the benzoxazinones, and the triazines.

It was surprising that the use of UV stabilizers in combination with the IR-reflective pigments described above gives useful films with excellent properties.

The inventive film protects, by way of example, packed goods from short-wavelength light in the wavelength range from 200 to 380 nm, its transmittance preferably being smaller than (<) 50% for radiation in the wavelength range from 750 to 1300 nm, the results being prevention of undesired increase in the temperatures of the packed product and resultant premature spoiling. When used in the construction sector the film moreover provides thermal protection, i.e. reduces the amount of increase in indoor temperatures, without yellowing on exposure to prolonged insolation.

The literature discloses UV stabilizers which absorb UV radiation and thus provide protection. However, when these known commercially available UV stabilizers are used it is found that the UV stabilizer has inadequate thermal stability and, at temperatures of from 200 to 240° C., decomposes or causes evolution of gas. It would therefore have been necessary to incorporate large amounts (from about 10 to 15% by weight) of UV stabilizer into the film so that it gives really effective absorption of UV light. However, at these high concentrations the film discolors markedly even before the production process is complete. Mechanical properties, too, are adversely affected. On orientation, exceptional problems occur, e.g. break-offs due to inadequate film strength (low ultimate tensile strength and modulus of elasticity), die deposits leading to profile variations, deposits of UV stabilizer and pigment on the rolls, leading to impairment of optical properties (marked haze, adhesion-related defects, inhomogeneous surface), and deposits in the stretching and setting frame, which contaminate the film. It was therefore surprising that even low concentrations of the preferred UV stabilizers achieve excellent UV protection, and that a film with low yellowness index is obtained. Surprisingly, the presence of the UV stabilizer has absolutely no effect on protection from radiation in the wavelength range from 750 to 1300 nm.

In one very particularly preferred embodiment, the inventive film comprises, as UV stabilizer, 2-(4,6-diphenyl-1,3,5-triazin-2-yl)-5-hexyloxyphenol of the formula

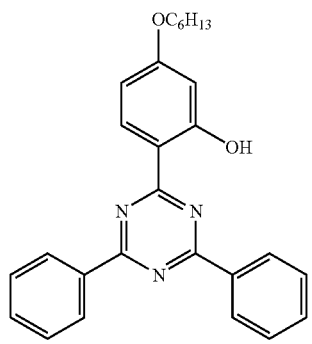

or 2,2'-methylenebis[6-benzotriazol-2-yl)-4-(1,1,2,2-tetramethylpropyl)phenol] of the formula

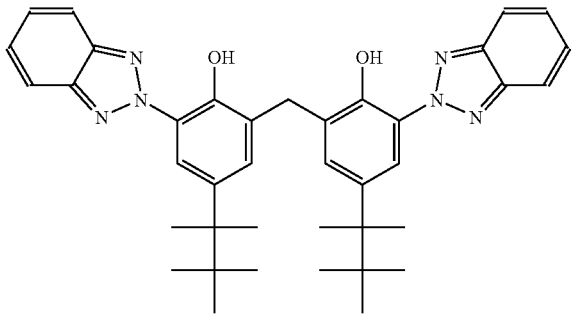

or 2,2'-1,4-phenylenebis(3,1-benzoxazin-4-one) of the formula

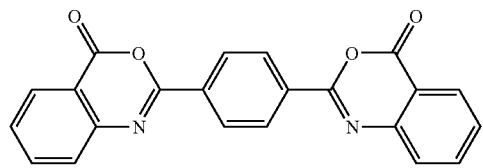

These, and other inventive UV stabilizers, are commercially available.

In another embodiment, it is also possible to use a mixture of these UV stabilizers, or a mixture of at least one of these UV stabilizers with other UV stabilizers. The total concentration of light stabilizer is preferably from 0.1 to 5.0% by weight, particularly preferably from 0.5 to 3.0% by weight, based on the weight of the layers modified therewith.

The base layer and/or outer layers and, if appropriate, intermediate layers present in the film may comprise not only the preferred lamellar, IR-reflective pigment and the UV stabilizer but also other conventional additives, e.g. fillers and antiblocking agents. They are advantageously added to the polymer or polymer mixture before the melting process begins.

Other additives which may be selected are a mixture of two or more different antiblocking agents, or a mixture of antiblocking agents of the same constitution but of different particle size. The conventional proportions of the particles may be added to the individual layers, e.g. in the form of a glycolic dispersion before preparation of the polyester is complete, or by way of masterbatches during extrusion. Pigment concentrations of from 0.0001 to 10% by weight, based on the weight of the layers modified therewith, have proven to be particularly suitable.

For particular applications it can be advantageous for the surface of the film to be chemically pretreated with an acid. Particularly suitable compounds for this process known as adhesion-promotion by etching are trichloroacetic acid, dichloroacetic acid, or hydro-fluoric acid, which act on the surface for a short period (from 5 to 120 seconds) and then are removed by means of air knives. This gives the film a very reactive, amorphous surface.

The inventive film may have at least one further functionality. The additional functionality is preferably that the film has been corona- or flame-treated and/or rendered flame-retardant, and/or coated on one or both sides.

In the case of single- or double-sided coating of the film, the thickness of the dried coating is generally from 5 to 100 nm, preferably from 20 to 70 nm, in particular from 30 to 50 nm. It is preferably applied in-line, i.e. during the film-production process, advantageously prior to the transverse orientation process. Particular preference is given to application by means of the reverse gravure-roll coating process, which can apply the coating extremely homogeneously at the layer thickness mentioned. The coatings are applied—preferably in aqueous form—in the form of solutions, suspensions, or dispersions, in order to give the film surface additional functionalities. Examples of substances or compositions which give additional functionality are acrylates (see WO 94/13476), ethylene-vinyl alcohols, polyvinylidene chloride, water glass (sodium silicate), aminosilanes (described in EP 0 359 017 or EP 0 346 768), hydrophilic polyesters (PET/IPA polyesters as described in EP-A-144 878 or U.S. Pat. No. 4,252,885, comprising the sodium salt of 5-sulfoisophthalic acid), copolymers having vinyl acetate units (see WO 94/13481), polyvinyl acetates, polyurethanes, the alkali metal or alkaline earth metal salts of ($C_{10}$–$C_{18}$) fatty acids, copolymers having units comprised of butadiene and acrylonitrile, methyl methacrylate, methacrylic acid and/or acrylic acid and/or esters thereof. The substances or compositions which give the additional functionality can comprise the usual additives, such as antiblocking agents and/or pH stabilizers, their amounts preferably being from 0.05 to 5% by weight, with preference from 0.1 to 3% by weight.

The compositions or substances mentioned are applied in the form of dilute, preferably aqueous solution, emulsion, or dispersion to one or both sides of the film. The solvent is then removed. If the coatings are applied in-line prior to the transverse stretching process, the heat treatment in the stretching frame is usually sufficient to volatilize the solvent and to dry the coating. The layer thicknesses of the dried coatings are then generally from 5 to 100 nm, preferably from 20 to 70 nm, in particular from 30 to 50 nm.

In order to establish further desired properties, the film may also have been corona- or flame-treated. The manner of treatment is usually such that the surface tension of the film is then generally above 45 mN/m.

In another embodiment, the inventive film has been rendered flame-retardant. Flame-retardant means that in what is known as a fire protection test the film complies with the conditions of DIN 4102 Part 2 and in particular the conditions of DIN 4102 Part 1, and can be allocated to construction materials class B2 and in particular B1 for low-flammability substances. The film, if appropriate rendered flame-retardant, is moreover intended to achieve at least the fire classification VTM-2 in a UL 94 VTM fire test.

Very surprisingly, fire tests to DIN 4102 and UL 94 VTM have shown that it is entirely sufficient, by way of example, to equip merely the core layer of the film with flame retardant in order to achieve improved fire-protection performance. If there is a requirement and if fire-protection requirements are stringent, the outer layers of the film may also have been rendered flame-retardant.

The film then comprises at least one flame retardant, which is preferably fed by way of masterbatch technology directly during film production, the proportion of this flame retardant generally being in the range from 0.2 to 30% by weight, preferably from 0.5 to 25% by weight, particularly preferably from 1.0 to 20% by weight, based on the weight of the layer modified therewith. The proportion of the flame retardant in the masterbatch is generally from 5 to 60% by weight, preferably from 10 to 50% by weight, based in each case on the total weight of the masterbatch. Examples of suitable flame retardants are organic bromine compounds, organic chlorine compounds, or organic nitrogen compounds, or metal hydroxides or metal oxide trihydrates. However, a disadvantage of the halogen compounds is that in the event of a fire toxic and corrosive hydrogen halides can be produced. Another disadvantage is the low light resistance of a film modified therewith.

It is significant that the flame retardant is soluble in the polymer or polyester, because otherwise compliance with the optical properties required is not achieved.

Examples of other suitable flame retardants are organophosphorus compounds, such as carboxyphosphinic acids, their anhydrides, and dimethyl methanephosphonate. Very suitable flame retardants here are those in which the phosphorus compound has chemical bonding to the polyester.

In this preferred embodiment, the inventive low-flammability film comprises not only polyester, preferably PET, the IR-reflective pigment, and the UV stabilizer, but also from 1 to 20% by weight of an organophosphorus compound as flame retardant soluble in the polyester. Bis(2-hydroxyethyl) [(6-oxido-6H-dibenzo-[c,e][1,2]oxaphosphorin-6-yl)methyl]-butanedicarboxylate having the formula

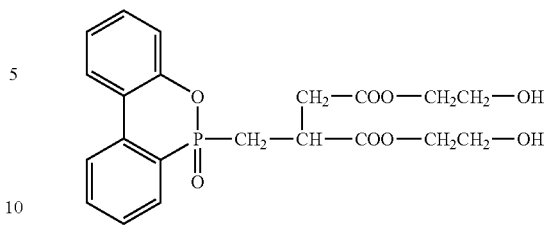

is preferred as flame retardant.

Because the flame retardants generally have some degree of sensitivity to hydrolysis, additional use of a hydrolysis stabilizer can be advisable. Examples of suitable hydrolysis stabilizers here are polymeric carbodiimides. In this preferred embodiment, the inventive low-flammability film comprises, as main constituent, crystallizable polyester or PET, from 1 to 20% by weight of an organophosphorus compound as flame retardant soluble in the polyester, and preferably from 0.1 to 1.0% by weight of a hydrolysis stabilizer, based on the weight of the layer modified therewith.

The proportions described of flame retardant, pigment, and UV stabilizer have also proven advantageous when the main constituent of the film is not polyethylene terephthalate, but another polyester.

Measurements also showed that the inventive film does not become brittle when exposed to temperatures of 100° C. over a prolonged period.

Where very good sealability is required, and where this property cannot be achieved by way of an in-line coating, the inventive film has at least three layers and then encompasses, in a particular embodiment, the base layer B, a sealable outer layer A, and a sealable or non-sealable outer layer C. If the outer layer C is likewise sealable, the two outer layers are then preferably identical.

The sealable outer layer A applied via coextrusion to the base layer B preferably has a structure based on polyester copolymers, and is in essence or entirely composed of copolyesters which are predominantly composed of isophthalic acid units, of bibenzenecarboxylic acid units, and of terephthalic acid units, and of ethylene glycol units. The remaining monomer units are derived from the other aliphatic, cycloaliphatic, or aromatic diols and, respectively, dicarboxylic acids which may also occur in the base layer. The preferred copolyesters which provide the desired sealing properties are those comprised of ethylene terephthalate units and of ethylene isophthalate units. The proportion of ethylene terephthalate is preferably from 40 to 95 mol %, the corresponding proportion of ethylene isophthalate being from 60 to 5 mol %. Preference is given to copolyesters in which the proportion of ethylene terephthalate is from 50 to 90 mol %, the corresponding proportion of ethylene isophthalate being from 50 to 10 mol %, and very particular preference is given to copolyesters in which the proportion of ethylene terephthalate is from 60 to 85 mol %, the corresponding proportion of ethylene isophthalate being from 40 to 15 mol %.

The polymers used for the sealable or non-sealable outer layer C and for any intermediate layers present may in principle be the same as those used in the base layer.

The desired sealing properties and the desired processing properties of the inventive film are obtained from the combination of the properties of the copolyester used for the sealable outer layer and from the topographies of the sealable outer layer A and of the sealable or non-sealable outer layer C.

The minimum sealing temperature, preferably 110° C., and the seal seam strength, preferably at least 1.3 N/15 mm, is in particular achieved if the copolymers described in more detail above are used for the sealable outer layer A. The best sealing properties of the film are obtained if no further additives are added to the copolymer, in particular no inorganic or organic pigments. This gives the lowest minimum sealing temperature and the highest seal seam strengths for a given copolyester. However, the handling of the film is then subject to restriction, because the surface of the sealable outer layer A has a marked tendency toward blocking. The film is very difficult to wind and has only limited suitability for further processing on high-speed machines. To improve the handling of the film, and processibility, it is advantageous to modify the sealable outer layer A. This is best achieved with the aid of suitable antiblocking agents of a selected size, a particular concentration of which is added to the sealable layer, and specifically in such a way as firstly to minimize blocking and secondly to give only insignificant impairment of sealing properties. Suitable antiblocking agents are inorganic and/or organic particles, such as silicon dioxide (precipitated or fumed), calcium carbonate, magnesium carbonate, barium carbonate, calcium sulfate, barium sulfate, lithium phosphate, calcium phosphate, magnesium phosphate, titanium dioxide (rutile or anatase), kaolin (hydrated or calcined), aluminum oxide, aluminum silicates, lithium fluoride, the calcium, barium, or zinc salts of the dicarboxylic acids used, or crosslinked polymer particles, e.g. polystyrene or polymethyl methacrylate particles. It is also possible to select mixtures of two or more of the abovementioned particles, or mixtures of particles with the same chemical constitution but different particle size. If the sealable outer layer A comprises antiblocking agents, their total concentration (based on the outer layer A) is from 0.001 to 5% by weight, preferably from 0.01 to 2% by weight, and particularly preferably from 0.1 to 1% by weight. The median particle size ($d_{50}$ value) of the antiblocking agents is from 0.01 to 10 µm, preferably from 0.03 to 5 µm, and particularly preferably from 0.05 to 1 µm.

There may, if appropriate, also be an intermediate layer between the base layer and each of the outer layers. It may be composed of the polymers described for the base layer. In one particularly preferred embodiment, it is comprised of the polyester used for the base layer. It may comprise not only the IR-reflective pigment and the UV stabilizer but also other additives. The thickness of the intermediate layer is generally greater than 0.3 µm, and is preferably in the range from 0.5 to 15 µm, in particular from 1.0 to 10 µm.

The thickness of the outer layer(s) is generally greater than 0.1 µm, and is preferably in the range from 0.2 to 5.0 µm, in particular from 0.2 to 4.0 µm, and the thicknesses of the outer layers may be identical or different.

The total thickness of the inventive film may vary within wide limits and depends on the intended application. It is preferably from 3 to 200 µm, in particular from 5 to 150 µm, and particularly preferably from 10 to 100 µm, and the base layer here preferably constitutes from about 40 to 99% of the total thickness.

The inventive film can moreover be recycled without pollution of the environment, and the film produced from this recycled material exhibits practically no impairment of optical properties (in particular yellowness index) or of mechanical properties when comparison is made with a film comprised of virgin starting materials.

The inventive film can moreover be thermoformed without predrying, and can therefore be used to produce complex moldings.

The thermoforming process generally encompasses the steps of predrying, heating, molding, cooling, demolding, and heat-conditioning. A surprising finding in the thermoforming process was that the inventive films can be thermoformed without predrying. This advantage over thermoformable polycarbonate films or thermoformable polymethacrylate films, for which the required predrying times, depending on thickness, are from 10 to 15 hours at temperatures of from 100 to 120° C., dramatically reduces the costs for the forming process.

Examples of process parameters found for the thermoforming process were:

| Step of process | Inventive film |
| --- | --- |
| Predrying | not required |
| Mold temperature | from 100 to 160° C. |
| Heating time | smaller than (<) 5 seconds per 10 µm of thickness |
| Film temperature during thermoforming | from 160 to 200° C. |
| Possible orientation factor | from 1.5 to 2.0 |
| Reproduction of detail | good |
| Shrinkage | smaller than (<) 1.5% |

Surprisingly, optical properties, particularly mattness, haze, and transparency of the film, were found to remain homogeneous and unchanged during thermoforming with an orientation factor of 2.0. This is probably attributable to the fact that the lamellar, IR-reflective pigment particles have very substantial orientation parallel to the film surface via the high level of longitudinal and transverse stretching and subsequent heat-setting in the film-production process.

The present invention also provides a process for producing the inventive film. The production process usually involves an extrusion process, for example on an extrusion line. It has proven particularly advantageous to add the IR-reflective pigment, the UV stabilizer, and, if appropriate, the other additives in the form of predried or precrystallized masterbatches prior to the extrusion process.

In masterbatch technology it is preferable that the grain size and the bulk density of the masterbatches are similar to the grain size and the bulk density of the polyester used, thus achieving homogeneous dispersion, which gives homogeneous properties.

The inventive polyester films may be produced by known processes from a polyester, if appropriate from other polymers, from at least one preferably lamellar, IR-reflective pigment and one UV stabilizer, and, if appropriate, from other conventional additives (the latter in a usual amount of from 0.1 to 30% by weight, based on the weight of the layers modified therewith), in the form of multilayer—if appropriate coextruded—films with identical or differently designed surfaces, where one surface by way of example comprises particles and the other does not, or where all of the layers comprise particles. One or both surfaces of the film may moreover have been provided with a functional coating by known processes.

Masterbatches which comprise the IR-reflective pigments should preferably have been precrystallized or predried. The same applies to masterbatches which comprise UV stabilizers, comprise flame retardants, and/or comprise other additives. This predrying involves gradual heating of the masterbatches at reduced pressure (from 20 to 80 mbar, preferably from 30 to 60 mbar, in particular from 40 to 50 mbar), stirring, and, if appropriate, after-drying at a constant, elevated temperature (likewise at reduced pressure). The masterbatches are preferably charged batchwise at room temperature from a feed vessel in the desired blend together with the polyester and, if appropriate, with other polymer components into a vacuum dryer which during the course of the drying time or residence time traverses a temperature profile of from about 10 to 160° C., preferably from 20 to 150° C., in particular from 30 to 130° C. During the residence time of about 6 hours, preferably 5 hours, in particular 4 hours, the mixture of raw material is stirred at from about 10 to 70 rpm, preferably from 15 to 65 rpm, in particular from 20 to 60 rpm. The resultant precrystallized or predried raw material mixture is after-dried in a downstream, likewise evacuated, container at from about 90 to 180° C., preferably from 100 to 170° C., in particular from 110 to 160° C., for from 2 to 8 hours, preferably from 3 to 7 hours, in particular from 4 to 6 hours.

In the preferred extrusion or coextrusion process for production of the film, the molten polymer material is extruded with the other ingredients through a flat-film die, and quenched on a chill roll in the form of a substantially amorphous prefilm. This film is then reheated and oriented longitudinally and transversely, or transversely and longitudinally, or longitudinally, transversely, and again longitudinally and/or transversely. The stretching temperatures are generally above the glass transition temperature $T_g$ of the film by from 10 to 60° C., the longitudinal stretching ratio is usually from 2.0 to 6.0, in particular from 3.0 to 4.5, the transverse stretching ratio being from 2.0 to 5.0, in particular from 3.0 to 4.5, and the ratio for any second longitudinal and transverse stretching carried out being from about 1.1 to 5.0. The first longitudinal stretching may also be carried out simultaneously with the transverse stretching (simultaneous stretching). Heat-setting of the film follows at oven temperatures of from 180 to 260° C., in particular from 220 to 250° C. The film is then cooled and wound.

It was surprising that in particular the use of the additives or ingredients described and of masterbatch technology, combined with a suitable predrying and/or precrystallization process can produce an IR-reflective film with the required property profile without technical problems (such as caking in the dryer). During the production process, no, or almost no, deposits on the dies or condensation on the frames was observed, the result being that the inventive film has excellent optical properties, an excellent profile, and excellent layflat. It gives excellent results when oriented and can therefore be produced cost-effectively in a reliable process.

It was surprising that the film has not only excellent thermoformability without any effect on optical properties but also exhibited a very small change, smaller than (<) 6, in yellowness index after 5000 hours of Weather-Ometer weathering (WOM weathering), and that the IR-reflective effect, the high light transmittance, and the scattering power for visible light remain substantially unaffected. Even after this very aggressive artificial weathering, transmittance for radiation in the wavelength range from 750 to 1300 nm (IR) is smaller than 50%.

Another very surprising fact is that the regrind can also be reused during film production without any adverse effect on the yellowness index of the film. There is also no adverse change in the yellowness index within the limits of measurement precision when comparison is made with an untreated film.

The combination of their properties makes the inventive films suitable for a wide variety of applications, for example in the indoor and outdoor sector, in the construction sector and in the construction of exhibition stands, in the fitting-out of shops and of stores, in the electronics sector, and in the lighting sector, for greenhouses, exhibition requisites and promotional requisites, illuminated advertising profiles, protective glazing for machines and for vehicles, displays and placards, and for packaging, in particular of heat-sensitive goods, with no restriction thereto.

Inventive examples are used below for further illustration of the invention, which is not restricted thereto.

Test Methods

| Test methods | |
| --- | --- |
| DIN = | Deutsches Institut für Normung [German Institute for Standardization] |
| ASTM = | American Society for Testing and Materials |
| ISO | International Organization for Standardization |

Light Transmittance (Transparency)

Light transmittance is the ratio of total transmitted light to the amount of incident light.

Light transmittance is measured using ®HAZEGARD plus (Byk Gardner, Germany) test equipment to ASTM D1003.

Haze/Clarity

Haze is the percentage proportion of transmitted light that deviates by more than 2.5° from the average direction of the incident light beam. Clarity is determined at an angle of less than 2.5°.

Haze and clarity are measured using ®HAZEGARD plus (Byk Gardner, Germany) test equipment to ASTM D1003.

Yellowness Index

The yellowness index of the film is determined to ASTM D1925-70 by means of a Lambda 12 spectrophotometer (Perkin Elmer, US), D65 standard illuminant, 10° standard observer. Yellowness index is calculated from the measured standard color values X, Y, and Z by the following equation $$YID = [100 \cdot (1.28 \cdot X - 1.06 \cdot Z)]/Y$$

Surface Defects

Surface defects were determined visually.

Mechanical Properties

Modulus of elasticity, ultimate tensile strength, tensile strain at break, and $F_5$ value are measured longitudinally and transversely to ISO 527-1-2 with the aid of tensile test equipment (Zwick, 010, Ulm, Germany).

Standard Viscosity (SV) and Intrinsic Viscosity (IV):

Standard viscosity SV was measured—by a method based on DIN 53726—using a 1% strength solution in dichloroacetic acid (DCA) at 25° C. SV (DCA)=$(\eta_{rel}-1) \times 1000$. Intrinsic viscosity (IV) is calculated as follows from standard viscosity (SV)

$$IV=[\eta]=6.907 \cdot 10^{-4} SV\,(DCA)+0.063096\,[dl/g]$$

Fire Performance

Fire performance was determined to DIN 4102 Part 2, construction materials class B2, and to DIN 4102 Part 1, construction materials class B1, and also in the UL 94 VTM test.

Thermoformability

The films from inventive examples 1 to 8 and comparative examples 1 and 2 can be thermoformed without predrying to give moldings on commercially available thermoforming machines, e.g. from Adolf Illig Maschinenbau (Heilbronn, Germany). Reproduction of detail in the moldings is excellent, with a homogeneous surface.

Weathering/UV Resistance

UV resistance was tested as follows to the ISO 4892 test specification:

| Test equipment | Atlas Ci65 Weather-Ometer |
|---|---|
| Test conditions | to ISO 4892, i.e. artificial weathering |
| Irradiation time | 5000 hours (per side) |
| Irradiation rate | 0.5 W/m$^2$, 340 nm |
| Temperature | 63° C. |
| Relative humidity | 50% |
| Xenon lamp | inner and outer filter comprised of borosilicate |
| Irradiation cycles | 102 minutes of UV light, then 18 minutes of UV light with water sprayed onto the specimens, then again 102 minutes of UV light, etc. |

Minimum Sealing Temperature

Hot-sealed specimens (seal seam 20 mm×100 mm) were produced using Brugger Feinmechanik (Munich, Germany) HSG/ET sealing equipment, by sealing the film at different temperatures with the aid of two heated sealing jaws at a sealing pressure of 2 bar and with a sealing time of 0.5 s. Test strips of width 15 mm were cut from the sealed specimens. T-seal seam strength was measured as for determination of seal seam strength. The minimum sealing temperature is the temperature at which a seal seam strength of at least 0.5 N/mm is achieved.

Seal Seam Strength

To determine seal seam strength, two film strips of width 15 mm were mutually superposed and sealed at 130° C. with a sealing time of 0.5 s and a sealing pressure of 2 bar, using NDS equipment from Brugger Feinmechanik (Munich, Germany) and a single-side-heated sealing jaw. Seal seam strength was determined by the T-peel method.

Gloss

Gloss was determined to DIN 67 530. The reflectance was measured, this being an optical value characteristic of the film surface. Based on the standards ASTM D523-78 and ISO 2813, the angle of incidence was set at 60°. A beam of light hits the flat test surface at the set angle of incidence and is reflected and/or scattered by this surface. A proportional electrical variable is displayed representing light rays hitting the detector. The value measured is dimensionless and must be stated together with the angle of incidence.

Roughness

Roughness $R_a$ of the film was determined to DIN 4768 with a cut-off of 0.25 nm. Roughness values $R_t$ and $R_z$ are measured using DIN 4768 as well.

IR Permeability

The IR permeability of the film is determined on the basis of an IR transmittance spectrum. An FTIR 1600 from Perkin Elmer, US was used. The wavelength range measured extends from 750 to 1300 nm. The IR permeability measured in % is the ratio of the amount of light transmitted to the amount of light incident in this wavelength range.

Diethylene Glycol Content, Polyethylene Glycol Content, and Isophthalic Acid Content Diethylene glycol content, polyethylene glycol content, and isophthalic acid content is determined by gas chromatography after alkaline digestion of the specimen.

Determination of Length of Vacuoles

The length of vacuoles in the film was determined on the basis of scanning electron micrographs of microtom sections.

EXAMPLES

Each of the Examples and Comparative Examples below uses multilayer films which were produced on the extrusion line described. Unless otherwise stated, the thickness of each film is 23 µm. Unless otherwise stated, in each of the examples the polyethylene terephthalate content is reduced by the percentage by weight of the various additives.

The films were weathered to test specification ISO 4892 on both sides, in each case for 5000 hours, using a Ci65 Weather-Ometer (Atlas, US), and then tested for mechanical properties, discoloration, surface defects, haze, and gloss.

The additives for achieving IR reflectance and for achieving the additional functionalities were fed in the form of various masterbatches:

Masterbatch MB1 was composed of 10% by weight of the lamellar pigment IRIODIN® SHR 870 (Merck, Germany) and 90% of polyethylene terephthalate (RT49, KoSa, Germany). The bulk density of the masterbatch was 750 kg/m$^3$.

Masterbatch MB2 was comprised of 20% by weight of 2-(4,6-diphenyl-1,3,5-triazin-2-yl)-5-hexyloxyphenol (TINUVIN® 1577 from Ciba Specialty Chemicals, Switzerland) and 80% by weight of polyethylene terephthalate (RT49, KoSa, Germany). The bulk density of the materbatch was 750 kg/m.

The following masterbatch was used to produce a flame-retardant film:

Masterbatch MB3, a copolyester comprised of terephthalic acid, ethylene glycol, and 30% by weight of bis(2-hydroxyethyl)[(6-oxido-6H-dibenzo[c,e][1,2]-oxaphosphorin-6-yl)methyl]butanedicarboxylate (VA09, KoSa, Germany).

Example 1

A coextruded ABA multilayer film was produced. The polyethylene terephthalate from which the base layer was produced had a standard viscosity SV (DCA) of 810 (corresponding to an intrinsic viscosity IV [DCA] of 0.658 dl/g), an IPA content of 8.0%, and a DEG content of 2.5%.

The two outer layers A used a polyethylene terephthalate which had a standard viscosity SV (DCA) of 770 (corresponding to an intrinsic viscosity IV [DCA] of 0.632 dl/g) and an IPA content of 8.0%, and a DEG content of 2.5%. Both outer layers comprised not only polyethylene terephthalate but also 20% by weight of masterbatch MB1 and 5% by weight of masterbatch MB2.

70% by weight of polyethylene terephthalate for the base layer and 30% by weight of recycled polyethylene terephthalate material for the base layer, and also 75% by weight of polyethylene terephthalate for the outer layers, 20% by weight MB1 for the outer layers, and 5% by weight of MB2 for the outer layers were charged at room temperature from separate feed vessels into a respective vacuum dryer for the base layer and a vacuum dryer for the outer layers. Both vacuum dryers traversed a temperature profile of from 25 to 130° C. from the charging time to the end of the residence time. During the residence time of about 4 hours, the polymer mixtures for base layer and outer layers were stirred at 61 rpm. The precrystallized or predried polymer mixtures were after-dried in the downstream hoppers, likewise in vacuo (base layer and outer layers) at 140° C. for 4 hours. The ABA film of thickness 23 μm was then produced by the extrusion process described. The thickness of each of the two outer layers A was 1 μm. The thickness of the base layer was 21 μm.

The process parameters were:

| | |
|---|---|
| Longitudinal stretching ratio $\lambda_L =$ | 3.1 |
| Longitudinal stretching temperature $T_L =$ | 110° C. |
| Transverse stretching ratio $\lambda_T =$ | 3.1 |
| Transverse stretching temperature $T_T =$ | 110° C. |
| Heat-setting temperature $T_{set} =$ | 230° C. |

Example 2

An ABA film was produced as in Example 1. In contrast to Example 1, the film comprised only 10% by weight of MB1 in the two outer layers A.

Example 3

Example 1 was repeated. Unlike in Example 1, the ABA film also comprised 20% by weight of MB3 in the base layer.

Example 4

Example 1 was repeated. Unlike in Example 1, the ABA film also comprised 10% by weight of MB1 in the base layer.

Example 5

Example 1 was repeated. Unlike in Example 1, the ABA film also comprised 10% by weight of MB1 and 5% by weight of MB2 in the base layer.

Example 6

Example 1 was repeated. Unlike in Example 1, the process parameters were as follows:

| | |
|---|---|
| Longitudinal stretching ratio $\lambda_L =$ | 3.5 |
| Longitudinal stretching temperature $T_L =$ | 110° C. |
| Transverse stretching ratio $\lambda_T =$ | 3.5 |
| Transverse stretching temperature $T_T =$ | 110° C. |
| Heat-setting temperature $T_{set} =$ | 230° C. |

Example 7

Unlike in Example 1, an ABC film was produced, which was sealable on one side (side C). Outer layer A and base layer were identical with the layers of Example 1.

For the sealable outer layer C of thickness 1 μm, a copolyester was used, comprised of 78 mol % of ethylene terephthalate and 22% by weight of ethylene isophthalate (prepared via transesterification in the presence of a manganese catalyst, manganese concentration: 100 ppm).

Example 8

Example 7 was repeated. Unlike in Example 7, the base layer also comprised 10% by weight of MB1 and 5% by weight of MB2.

Comparative Example 1

Example 1 was repeated. Unlike in Example 1, the film comprises no MB2.

Comparative Example 2

Example 1 was repeated. Unlike in Example 1, the film comprises no MB1.

Comparative Example 3

Unlike in Example 1, the film is unoriented.

Comparative Example 4

Unlike in Example 1, the polyethylene terephthalate used for the base layer and the outer layers has a DEG content of 0.6% by weight and an IPA content of 0% by weight.

Comparative Example 5

Example 3 of WO 94/05727 was repeated.
The results achieved are given in the table.

TABLE

Property profile of films produced

| Properties | | E 1 | E 2 | E 3 | E 4 | E 5 | E 6 | E 7 | E 8 | CE 1 | CE 2 | CE 3 | CE 4 | CE 5 |
|---|---|---|---|---|---|---|---|---|---|---|---|---|---|---|
| Appearance | | matt | matt | matt | matt | matt | matt | matt | matt | matt | clear | hazy | matt | hazy |
| Surface defect[1] | | ++ | ++ | ++ | ++ | ++ | ++ | ++ | ++ | ++ | ++ | +− | +− | − |
| Transparency | % | 88 | 91 | 87 | 84 | 85 | 86 | 91 | 90 | 89 | 92 | 88 | 84 | 85 |
| Haze | % | 12 | 8 | 14 | 18 | 20 | 33 | 10 | 11 | 12 | 1 | 7 | 27 | 12 |
| Clarity | % | 70 | 72 | 69 | 61 | 55 | 42 | 73 | 72 | 71 | 89 | 71 | 64 | 89 |
| Vacuoles from | μm | 0.5– | 0.5– | 0.5– | 0.5– | 0.5– | 2.0– | 0.5– | 0.5– | 0.5– | —[2] | —[2] | 1.5– | —[2] |
| to | | 15 | 15 | 15 | 15 | 15 | 20 | 15 | 15 | 15 | | | 25 | |
| 60° gloss | — | 39 | 54 | 41 | 39 | 40 | 36 | 40[4] | 41[4] | 39 | 73 | 50 | 35 | 81 |
| Roughness $R_a$ | nm | 311 | 167 | 316 | 305 | 315 | 432 | 308[4] | 315[4] | 335 | 18 | 287 | 432 | 182 |
| $R_t$ | nm | 2787 | 1870 | 2690 | 2812 | 2723 | 3054 | 2743[4] | 2798[4] | 2389 | 108 | 2199 | 3159 | 1489 |
| $R_z$ | nm | 1991 | 1267 | 1901 | 1956 | 1921 | 2178 | 1948[4] | 1979[4] | 1810 | 54 | 1729 | 2156 | 1115 |

TABLE-continued

Property profile of films produced

| Properties | | E 1 | E 2 | E 3 | E 4 | E 5 | E 6 | E 7 | E 8 | CE 1 | CE 2 | CE 3 | CE 4 | CE 5 |
|---|---|---|---|---|---|---|---|---|---|---|---|---|---|---|
| IR transmittance | % | 31 | 42 | 29 | 19 | 17 | 25 | 33 | 34 | 32 | 78 | 59 | 29 | 39 |
| Longitudinal modulus of elasticity | N/nm$^2$ | 4087 | 4121 | 3999 | 4039 | 4093 | 4204 | 4059 | 4167 | 4111 | 4199 | 2892 | 4522 | 2523 |
| Transverse modulus of elasticity | N/nm$^2$ | 5695 | 5523 | 5538 | 5601 | 5559 | 5730 | 5584 | 5611 | 5698 | 5638 | 3110 | 5859 | 3219 |
| Longitudinal F5 | N/nm$^2$ | 108 | 106 | 110 | 108 | 110 | 121 | 108 | 109 | 112 | 106 | 91 | 123 | — |
| Transverse F5 | N/nm$^2$ | 113 | 111 | 114 | 116 | 112 | 120 | 112 | 113 | 110 | 112 | 89 | 132 | — |
| Longitudinal ultimate tensile strength | N/nm$^2$ | 244 | 232 | 241 | 239 | 243 | 263 | 243 | 242 | 235 | 239 | 90 | 271 | 50 |
| Transverse ultimate tensile strength | N/nm$^2$ | 269 | 254 | 251 | 266 | 265 | 276 | 255 | 257 | 261 | 260 | 97 | 280 | 45 |
| Longitudinal tensile strain at break | % | 124 | 131 | 122 | 125 | 127 | 117 | 120 | 123 | 124 | 126 | 143 | 115 | 10 |
| Transverse tensile strain at break | % | 116 | 119 | 112 | 114 | 115 | 109 | 114 | 117 | 118 | 118 | 139 | 107 | 5 |
| Thermoformability[1] | — | ++ | ++ | ++ | ++ | ++ | ++ | ++ | ++ | ++ | ++ | − | − | − |
| Yellowness index after production | — | 1.5 | 1.6 | 1.7 | 1.6 | 1.9 | 1.5 | 1.6 | 1.8 | 1.3 | 1.4 | 1.4 | 1.6 | 5.6 |
| Yellowness index after 5000 h of weathering | — | 3.9 | 4.1 | 3.7 | 4.0 | 3.1 | 3.9 | 3.7 | 3.2 | 8.9 | 4.1 | 3.9 | 3.8 | 15.3 |
| UV absorption[1] | — | ++ | ++ | ++ | ++ | ++ | ++ | ++ | ++ | − | ++ | ++ | ++ | − |
| Fire performance[1] | — | — | — | ++ | — | — | — | — | — | — | — | — | — | ++ |
| Minimum sealing temperature | °C. | — | — | — | — | — | — | 95 | 96 | — | — | — | — | — |
| Seal seam strength (side C/side C) | N/nm$^2$ | — | — | — | — | — | — | 2.3 | 2.2 | — | — | — | — | — |

[1]− poor; +− acceptable; + good; ++ very good
[2]no vacuoles
[3]not measurable
[4]measured on side A

What is claimed is:

1. A multilayer, biaxially oriented, thermoformable polyester film comprising
   a. as a constituent of the base layer B, a crystallizable polyester having a diethylene glycol content of greater than or equal to 1% by weight and/or an isophthalic acid content of greater than or equal to 2% by weight and/or a polyethylene glycol content greater than or equal to 1% by weight,
   b. at least one IR-reflective pigment forming vacuoles and
   c. at least one UV stabilizer;
   wherein said film exhibits diffuse scattering behavior.

2. The polyester film as claimed in claim 1, wherein the crystallizable polyester is polyethylene terephthalate, polyethylene naphthalate, polybutylene terephthalate or polytrimethylene terephthalate.

3. The polyester film as claimed in claim 1, wherein the crystallizable polyester has a diethylene glycol content of from about 1 to 10% by weight and/or an isophthalic acid content of from about 2 to 20% by weight and/or a polyethylene glycol content of from about 1 to 10% by weight.

4. The polyester film as claimed in claim 1, wherein the content of crystallizable polyester in the base layer is from about 50 to 100% by weight based on the weight of the base layer B.

5. The polyester film as claimed in claim 1, wherein the IR-reflective pigment is platelet-shaped.

6. The polyester film as claimed in claim 1, wherein the IR-reflective pigment is sheet silicate coated with metal oxides.

7. The polyester film as claimed in claim 1, wherein the film contains between about 0.5 and 50% by weight of the IR-reflective pigment, based on the weight of the layers modified with it.

8. The polyester film as claimed in claim 1, wherein the film has a transmission of less than about 50% for radiation in the wavelength range between 750 and 1300 nm.

9. The polyester film as claimed in claim 1, wherein the UV stabilizer is a 2-hydroxybenzotriazole, a benzoxazinone or a triazine.

10. The polyester film as claimed in claim 1, wherein the film comprises the UV stabilizer in an amount of from about 0.1 to 5% by weight based on the weight of the layers modified with it.

11. The polyester film as claimed in claim 1, which further comprises a flame retardant.

12. The polyester film as claimed in claim 1, wherein the film has an A-B-C layer structure, and the outer layers A and C may be the same or different.

13. The polyester film as claimed in claim 1, wherein the outer layers A and/or C also comprise the crystallizable polyester of the base layer B.

14. The polyester film as claimed in claim 1, wherein at least one outer layer A or C is a sealable outer layer.

15. The polyester film as claimed in claim 1, wherein the film is coated functionally on one or both surfaces.

16. A process for preparing the polyester film as claimed in claim 1, comprising the steps of
   a. producing a film by coextrusion
   b. biaxially stretching the film and
   c. thermosetting the stretched film.

17. A process for adjusting the mattness of the polyester film as claimed in claim 1, which comprises varying the longitudinal and/or transverse stretching ratio, the stretching temperatures and/or the temperature of the thermosetting without changing the composition of the film.

18. A thermally protective coating or packaging comprising polyester film as claimed in claim 1.

19. A film according to claim 1, wherein said film comprises a base layer disposed between two outer layers and said IR-reflective pigment and said CV stabilizer are present in said outer layers alone, said film exhibiting a transmittance for electromagnetic radiation in the wavelength range from 750 to 1300 nm of less than 50%.

* * * * *

UNITED STATES PATENT AND TRADEMARK OFFICE
CERTIFICATE OF CORRECTION

PATENT NO.        : 7,189,451 B2                                    Page 1 of 1
APPLICATION NO.   : 11/173439
DATED             : March 13, 2007
INVENTOR(S)       : Kiehne et al.

It is certified that error appears in the above-identified patent and that said Letters Patent is hereby corrected as shown below:

Title Page
Item (57), Abstract
Line 3, delete "diethylehe" insert --diethylene--

Claims
Column 22
Claim 19, Line 22, delete "CV" insert --UV --

Signed and Sealed this

First Day of May, 2007

JON W. DUDAS
*Director of the United States Patent and Trademark Office*